United States Patent
Inoue et al.

(10) Patent No.: US 9,187,008 B2
(45) Date of Patent: Nov. 17, 2015

(54) STRADDLE ELECTRIC VEHICLE (75) Inventors: Masafumi Inoue, Miki (JP); Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/354,549

(22) PCT Filed: Dec. 28, 2011

(86) PCT No.: PCT/JP2011/007330
§ 371 (c)(1),
(2), (4) Date: May 29, 2014

(87) PCT Pub. No.: WO2013/061390
PCT Pub. Date: May 2, 2013

(65) Prior Publication Data
US 2014/0262569 A1 Sep. 18, 2014

(30) Foreign Application Priority Data

Oct. 28, 2011 (JP) ................. 2011-006059

(51) Int. Cl.
*B60L 11/18* (2006.01)
*B62J 9/00* (2006.01)
*B62K 11/04* (2006.01)
*B62K 19/30* (2006.01)
*B60K 1/04* (2006.01)
*B62M 6/90* (2010.01)
*B62K 11/02* (2006.01)

(52) U.S. Cl.
CPC ............... *B60L 11/1877* (2013.01); *B60K 1/04* (2013.01); *B60L 11/1803* (2013.01); *B62J 9/00* (2013.01); *B62K 11/04* (2013.01); *B62K 19/30* (2013.01); *B60K 2001/0422* (2013.01); *B62K 11/02* (2013.01); *B62K 2204/00* (2013.01); *B62K 2208/00* (2013.01); *B62M 6/90* (2013.01)

(58) Field of Classification Search
CPC ...... B62M 6/90; B62K 2208/00; B62K 11/02
USPC ........................... 180/220, 68.5, 65.1
See application file for complete search history.

(56) References Cited

U.S. PATENT DOCUMENTS

2013/0228389 A1* 9/2013 Nakashima et al. .......... 180/220

FOREIGN PATENT DOCUMENTS

| JP | H117928 A | 1/1999 |
|----|-----------|--------|
| JP | 2003182669 A | 7/2003 |
| JP | 2004210074 A | 7/2004 |
| JP | 2006076496 A | 3/2006 |
| JP | 2010100124 A | 5/2010 |

OTHER PUBLICATIONS

ISA Japanese Patent Office, International Search Report of PCT/JP2011/007330, WIPO, Jan. 31, 2012, 4 pages.

* cited by examiner

*Primary Examiner* — Jeffrey J Restifo
*Assistant Examiner* — Erez Gurari
(74) *Attorney, Agent, or Firm* — Alleman Hall McCoy Russell & Tuttle LLP (57) ABSTRACT

A straddle electric vehicle comprises a seat on which a rider is seated in a straddle state; right and left foot steps on which the rider puts feet, an electric motor for generating driving power for moving the straddle electric vehicle; a battery unit which is an electric power supply for activating the electric motor; and a battery case for storing the battery unit. The battery case is placed between the steering shaft and the seat in a forward or rearward direction and includes a seat vicinity portion which faces the seat in the forward or rearward direction. The seat vicinity portion is smaller in dimension in a rightward or leftward direction than a portion of the battery case which is other than the seat vicinity portion.

14 Claims, 7 Drawing Sheets

STRADDLE ELECTRIC VEHICLE

TECHNICAL FIELD

The present invention relates to a straddle electric vehicle which is a straddle vehicle straddled by a rider, such as a motorcycle, an ATV (all terrain vehicle) or personal watercraft, and is an electric vehicle including as a driving power source an electric motor activated by electric power stored in batteries.

BACKGROUND ART

In recent years, a straddle electric vehicle which incorporates an electric motor as a driving power source has been developed. In a straddle electric motorcycle which is an example of the straddle electric vehicle, a rider straddling a vehicle body puts soles of the rider's feet on a pair of right and left foot steps at the lower portion of the vehicle, and sandwiches the outer surface of the vehicle body with knees to stabilize a driving attitude (see, e.g., Patent Literature 1).

CITATION LIST

Patent Literature

Patent Literature 1: Japanese Laid-Open Patent Application Publication No. 2004-210074

SUMMARY OF INVENTION

Technical Problem

In the straddle electric motorcycle disclosed in Patent Literature 1, the battery of a rectangular parallelepiped shape is placed below a seat. However, it is necessary to ensure below the seat a space in which a driving system such as an electric motor and a driving power transmission system are arranged. This causes a need to place the battery with a reduced height between the seat and the driving system. This makes it difficult to increase the battery in size and attain a high continued driving capability. If a priority is given to the continued driving capability, the battery increases in size and the rider cannot easily sandwich the vehicle body with the right and left knees.

Accordingly, an object of the present invention is to provide a straddle electric vehicle which can attain a high continued driving capability and allows the rider to easily sandwich the vehicle body with the knees.

Solution to Problem

The present invention has been made to attain the above described object. A straddle electric vehicle of the present invention comprises a steering shaft for steering a front wheel; a seat which is placed rearward relative to the steering shaft and on which the rider is seated in a straddle state; an electric motor for generating driving power for moving the straddle electric vehicle; a battery unit which is an electric power supply for activating the electric motor; and a battery case for storing the battery unit; wherein the battery case is placed between the steering shaft and the seat in a forward or rearward direction; wherein the battery case includes at least a seat vicinity portion which faces the seat in the forward or rearward direction; and wherein the seat vicinity portion is smaller in dimension in a rightward or leftward direction than a portion of the battery case which is other than the seat vicinity portion.

In accordance with this configuration, since the seat vicinity portion of the battery case is relatively small in the rightward or leftward direction, the rider straddling the seat can easily sandwich the seat vicinity portion with knees. In addition, the battery case can be placed to extend to a region between the steering shaft and the seat in the forward or rearward direction. The remaining portion of the battery case, which is other than the seat vicinity portion is relatively great in dimension in the rightward or leftward direction. This can increase the volume of the battery case. Therefore, the battery unit can also be increased in size and a high continued driving capability can be attained.

The battery unit may include at least a seat vicinity portion which faces the seat in the forward or rearward direction via the battery case; and the seat vicinity portion of the battery unit may be smaller in dimension in the rightward or leftward direction than a portion of the battery unit which is other than the seat vicinity portion.

In accordance with this configuration, the battery unit stored in the battery case is also provided with the seat vicinity portion as in the case of the battery case. In this structure, the seat vicinity portion of the battery unit can be stored in the seat vicinity portion of the battery case which is relatively small in size in the rightward or leftward direction, while the remaining portion of the battery unit can be stored in the remaining portion of the battery case. In this way, since the battery unit is formed according to the dimension of the battery case in the rightward or leftward direction, the battery unit can be placed inside the battery case such that the outer surface of the battery unit is close to the inner wall of the battery case. As a result, the battery can be increased in size.

The battery unit may include a plurality of assembled batteries which are combined in a vertical direction; and the assembled battery placed at an upper side may be smaller in dimension than the assembled battery placed at a lower side in the rightward or leftward direction, and may constitute the seat vicinity portion.

In accordance with this configuration, since the battery unit is constructed by combining the plurality of assembled batteries, the seat vicinity portion can be formed without using batteries of a special shape. In addition, since the lower portion of the battery unit is increased in dimension in the rightward or leftward direction, the center of gravity of the vehicle can be lowered.

In a rear portion of the battery unit, the number of assembled batteries placed at the upper side in the rightward or leftward direction may be less than the number of assembled batteries placed at the lower side in the rightward or leftward direction.

In accordance with this configuration, the seat vicinity portion can be easily formed by using the plurality of assembled batteries.

The assembled batteries placed at the lower side may be combined so as to form a lower gap which opens at its upper side; the assembled batteries placed at the upper side may be combined so as to form an upper gap which opens at its lower side; and the lower gap may be in communication with the upper gap.

In accordance with this configuration, the air easily flows from the lower gap to the upper gap or from the upper gap to the lower gap. This can facilitate heat transfer in the interior of the battery case, and hence prevent the heat from being accumulated in a localized region in the interior of the battery case.

In an upper portion of the battery unit, the number of assembled batteries which are placed at a rear side and arranged in the rightward or leftward direction is less than the number of assembled batteries which are placed at a front side and arranged in the rightward or leftward direction.

In accordance with this configuration, it becomes possible to easily form the seat vicinity portion using the plurality of assembled batteries.

The battery unit may include a plurality of assembled batteries which are combined, in an interior of the battery case; and the assembled battery placed at a rear side may be smaller in dimension than the assembled battery placed at a front side in the rightward or leftward direction, and may constitute the seat vicinity portion.

In accordance with this configuration, the seat vicinity portion can be formed using the plurality of assembled batteries such that the seat vicinity portion is made small in the rightward or leftward direction, without using batteries of a special shape.

A rear portion and an upper portion of the battery case may have a smaller width than a portion of the battery case which is other than the rear portion and the upper portion.

In accordance with this configuration, only a portion of the battery case which the rider's knees can easily reach is made smaller in width. Therefore, the rider can easily sandwich the vehicle body with the knees without substantially reducing the size of the battery case.

The battery unit may include a battery frame for fastening the plurality of assembled batteries; and the plurality of assembled batteries may be densely arranged in a state in which the plurality of assembled batteries are fastened to each other by the battery frame, in an interior of the battery case.

In accordance with this configuration, the plurality of assembled batteries restrict each other via the battery frame. Therefore, even if the battery unit is subjected to a load during driving, it becomes possible to prevent the assembled batteries from being displaced individually. As a result, a weight balance of the vehicle can be stabilized.

The straddle electric vehicle may further comprise electric components mounted to an upper surface of the battery unit; and a metal plate member placed to conform in shape to a surface of the battery unit and surfaces of the electric components; the metal plate member may electrically connect the unit to the electric components and electrically connects the electric components to each other; and the metal plate member may have a pair of primary surface and a secondary surface and a bent portion which is bent with respect to the primary surface or the secondary surface.

In accordance with this configuration, the structure in the vicinity of the electric components can be made compact, and the electric components can be firmly fastened to the battery unit via the metal plate member. Since the metal plate member is bent, the metal plate member is easily deflected in a direction in which the metal plate member is bent or in a direction in which the bent metal plate member is returned to its original shape. Even when an assembling dimension error occurs when the assembled batteries are laid out and the electric components are mounted, the deflection of the metal plate member absorbs the error, and allows for the electric connection between the assembled assemblies and the electric components and the electric connection between the electric components. As a result, an assembling work of the battery unit and the electric components can be simplified.

The straddle electric vehicle may comprise an inverter for converting DC power stored in the battery unit into AC power; and a wire member for electrically connecting the battery unit and the inverter to each other; the battery unit may include a battery frame for fastening the plurality of assembled batteries to each other; and the plurality of assembled batteries may be densely arranged in a state in which the plurality of assembled batteries are fastened to each other by the battery frame, in an interior of the battery case; and the wire member may include the metal plate member extending from the battery unit and a wire harness connected to the inverter, a terminal block for connecting the metal plate member to the wire harness is stored in the battery case, and the terminal block may be fastened to the battery frame.

In accordance with this configuration, it becomes possible to prevent a situation in which the metal plate member constituting the wire member through which a high-voltage current flows is exposed to outside the battery case, which provides advantages to the rider.

Advantageous Effects of Invention

As should be appreciated from the foregoing, in accordance with the present invention, it is possible to provide a straddle electric vehicle which can attain a high continued driving capability and allows a rider to easily sandwich a vehicle body with knees.

DESCRIPTION OF EMBODIMENTS

Hereinafter, embodiments of the present invention will be described with reference to the accompanying drawings. Throughout the drawings, the same or corresponding components are designated by the same reference symbols and will not be described in repetition in detail. The stated directions are referenced from the perspective of a rider riding in an automated electric two-wheeled vehicle (hereinafter will be simply referred to as "electric motorcycle") which is an exemplary straddle electric vehicle according to an embodiment of the present invention.

Figure 1:
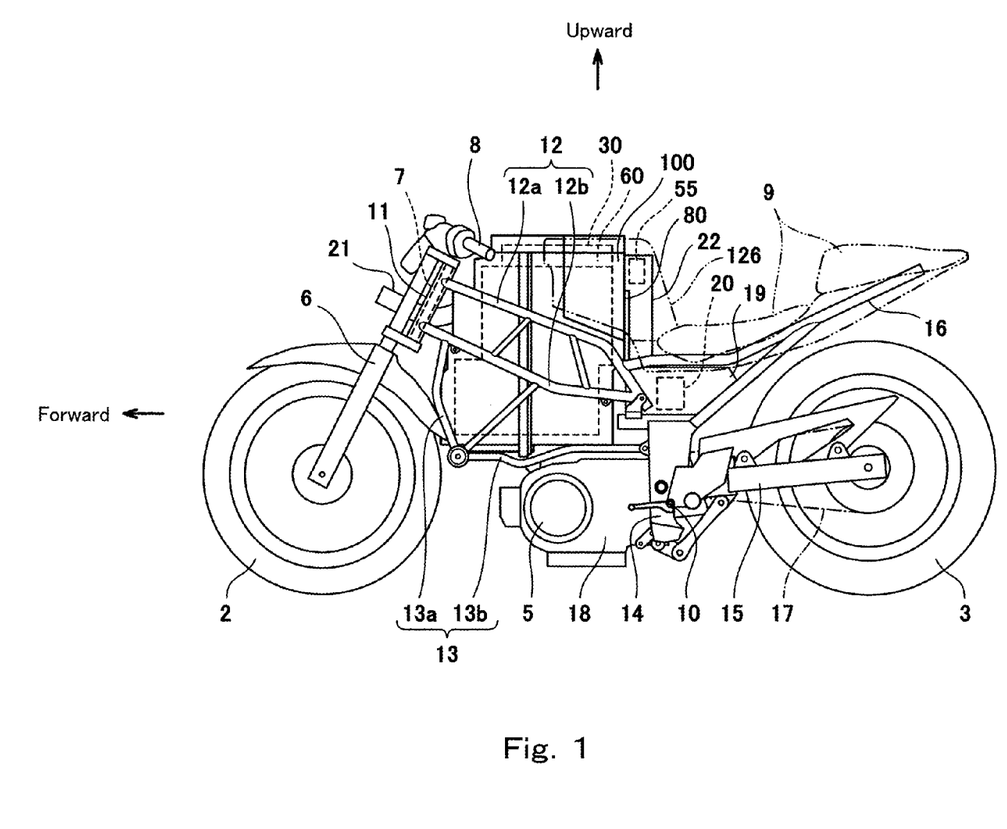
FIG. 1 is a left side view of an electric motorcycle which is an exemplary straddle electric vehicle according to an embodiment of the present invention.

FIG. 1 is a left side view of an electric motorcycle 1 which is an exemplary straddle electric vehicle according to an embodiment of the present invention. As shown in FIG. 1, the electric motorcycle 1 includes a front wheel 2 which is a driven wheel, a rear wheel 3 which is a drive wheel, a vehicle body frame 4 which is disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by driving power generated in the electric motor 5.

The front wheel 2 is rotatably mounted to the lower portion of a front fork 6 extending substantially vertically. A steering shaft 7 for steering the front wheel is coupled to the upper portion of the front fork 6, and a bar-type handle 8 is attached to the upper portion of the steering shaft 7. The vehicle body frame 4 includes the head pipe 11, a pair of right and left main frames 12, a pair of right and left down frames 13, and a pair of right and left pivot frames 14.

The steering shaft 7 is rotatably supported by the head pipe 11 such that the steering shaft 7 is rotatable. Each of the right and left main frames 12 includes an upper frame member 12a and a lower frame member 12b. The upper frame member 12a extends substantially in parallel with the lower frame member 12b. The upper frame member 12a and the lower frame member 12b extend rearward from the head pipe 11 such that they are inclined downward. The upper frame member 12a is bent downward at its rear end portion and is connected to the lower frame member 12b. Each of the down frames 13 includes a vertical frame member 13a extending substantially downward from the perspective of the head pipe 11, and a lower frame member 13b extending rearward substantially horizontally from the lower end of the vertical frame member 13a. The pivot frames 14 are connected to the rear end portions of the main frames 12 and the rear end portions of the lower frame members 13b.

The pivot frames 14 are connected to a swing arm 15 and a seat frame 16. The swing arm 15 extends substantially in a forward or rearward direction and is coupled at its front end portion to the pivot frames 14 such that the swing arm 15 is pivotable and supports the rear wheel 3 at its rear end portion such that the rear wheel 3 is rotatable. The seat frame 16 extends rearward from the rear end portions of the upper frame members 12a and the upper end portions of the pivot frames 14 such that the seat frame 16 is inclined upward. A seat 9 on which the rider and a passenger are seated is mounted to the seat frame 16.

The electric motorcycle 1 is a straddle vehicle. The rider is seated on the seat 9 in a straddle state. The lower end portions of the right and left pivot frames 14 are provided with a pair of right and left foot steps 10 (right foot step 10 is not shown in FIG. 1), respectively. The seat 9 is placed rearward relative to the steering shaft 7 and the head pipe 11. The rider straddling the seat 9 and facing forward can stretch hands forward and grip the handle 8. The rider straddling the seat 9 puts the rider's left foot on the left foot step 10 in a position which is leftward relative to the left pivot frame 14, and the rider's right foot on the right foot step 10 in a position which is rightward relative to the right pivot frame 14.

As described above, the electric motor 5 is the driving power source of the electric motorcycle 1. For this purpose, the electric motorcycle 1 includes a motor case 18, an inverter case 19 and a battery case 80. The motor case 18 contains the electric motor 5, while the inverter case 19 contains electric components including an inverter 20. The battery case 80 contains electric components including a battery unit 60. The battery unit 60 is an electric power supply for activating the electric motor 5 and is able to store DC power. The inverter 20 converts the DC power stored in the battery unit 60 into AC power. The electric motor 5 operates by the AC power generated by the conversion in the inverter 20 to generate the driving power. The driving power generated in the electric motor 5 is transmitted to the rear wheel 3 via a driving power transmission mechanism 17. The driving power transmission mechanism 17 may contain a transmission 17a (see FIG. 6). In this case, the transmission 17a may be stored in the motor case 18 together with the electric motor 5 (see FIG. 6).

In the present embodiment, the motor case 18 is mounted to the down frames 13 and the pivot frames 14 and placed in a region below the down frames 13 and in front of the pivot frames 14. The inverter case 19 is placed in a space of a substantially-inverted-triangle shape when viewed from a side, which is surrounded by the main frame 12, the pivot frame 14 and the seat frame 16. The inverter case 19 is positioned rearward relative to the lower rear end portion of the battery case 80 and below the front end portion of the seat 9.

The battery case 80 is placed between the steering shaft 7 and the seat 9 in the forward or rearward direction. In the present embodiment, the battery case 80 is sandwiched between the right and left main frames 12 and put on the lower frame members 13b. The rear end portions of the lower frame members 13b are connected to the upper portions of the pivot frames 14, respectively. Therefore, the whole battery case 80 is placed above the foot steps 10.

The battery case 80 includes at least a seat vicinity portion 100 which is positioned above the foot steps 10 and faces the seat 9 in the forward or rearward direction. The seat 9 is mounted to the seat frame 16 placed rearward relative to the battery case 80 such that the seat frame 16 extends from the pivot frames 14 and is inclined upward. Because of this, the seat vicinity portion 100 is positioned at the rear portion and upper portion of the battery case 80.

The rider seated on the seat 9 protrudes the knees forward relative to the seat 9. The rider performs steering in a state in which the seat vicinity portion 100 facing the seat 9 in the forward or rearward direction is sandwiched with the knees. In the present embodiment, the seat vicinity portion 100 is smaller in dimension than the remaining portion (to be precise, front portion or rear lower portion) of the battery case 80 in the rightward or leftward direction. This allows the rider to easily sandwich the seat vicinity portion 100 with the knees from right and left sides. Since the rider can easily sandwich the seat vicinity portion 100 with the knees, the rider easily steers the vehicle body without feeling tired. In addition, the rider can feel unity with the vehicle body and drive the vehicle stably at a high speed.

On the other hand, the remaining portion of the battery case 80, which is other than the seat vicinity portion 100, is relatively great in dimension in the rightward or leftward direction. This makes it possible to achieve both of a state in which the rider can easily sandwich the vehicle body with the knees and a state in which the dimension of the remaining portion which does not contact the rider's knees can be increased to a greatest possible degree. If the battery case 80 is increased in size, then the battery unit 60 is also increased in size, which allows the electric motorcycle 1 to attain a higher continued driving capability. A portion of the battery case 80 which is forward relative to the seat 9 is different in dimension in the rightward or leftward direction between a front side and a rear side such that the front side protrudes in the rightward or leftward direction father than the rear side. In other words, the upper portion of the battery case 80 which is forward relative to the seat vicinity portion 100, swells in a vehicle width direction relative to the seat vicinity portion 100. This allows the portion of the battery case 80 which is forward relative to the seat vicinity portion 100 to produce a wind-proof effect, which can suppress the ram air from colliding against the rider's feet. As a result, the rider who steers the motorcycle 1 at a high speed is less likely to get tired. The rear portion of the rider seat is placed above the front portion of the rear wheel 3. This can increase a spacing between the seat 9 and the steering shaft 7. In this way, a region in which the battery case 80 is placed can be increased in the forward or rearward direction.

An air-intake duct 21 is coupled to the front surface of the battery case 80, while an air discharge duct 22 is coupled to the rear surface of the battery case 80. The air-intake duct 21 extends forward from the front surface of the battery case 80. The air discharge duct 22 extends downward from the upper portion of the rear surface of the battery case 80 and is coupled to the upper surface of the inverter case 19. By providing these ducts 21, 22, ram air from forward is taken into the air-intake duct 21, and sent to the interior of the battery case 80 via the air-intake duct 21. Also, the air which is discharged from the interior of the battery case 80, is sent to the interior of the inverter case 19 via the air discharge duct 22. In this way, the electric components stored in the battery case 80 and the electric components stored in the inverter case 19 can be cooled by the air. As a result, reliability of the operation of these electric components can be maintained. An exhaust fan 55 is mounted to the rear portion of the battery case 80. By the operation of the exhaust fan 55, the air is easily sent from the interior of the battery case 80 to the air discharge duct 22.

Since the air discharge duct 22 extends downward from the battery case 80, the rider can sandwich the air discharge duct 22 with right and left thighs. The air discharge duct 22 can naturally discharge the air from forward, to a region which is rearward of the battery case 80 without interfering with the rider. Rather, the air discharge duct 22 has a structure for allowing the rider to easily sandwich the vehicle body with the knees or the thighs.

In the present embodiment, the battery case 80 is placed inward relative to the right and left main frames 12 and thereby is protected by the main frames 12. The rear portion of the battery case 80 has a portion with a smaller width. This makes it possible to suitably reduce a spacing between the rear end portions of the main frames 12. Therefore, the main frames 12 protect the battery case 80 and do not substantially interfere with the rider sandwiching the vehicle body with the knees and the thighs. Especially, in the present embodiment, a portion of the battery case 80 which is above the main frames 12 has a smaller width. This allows the rider to easily sandwich the vehicle body with the knees and the thighs and the battery case 80 to be protected by the frames.

Figure 2:
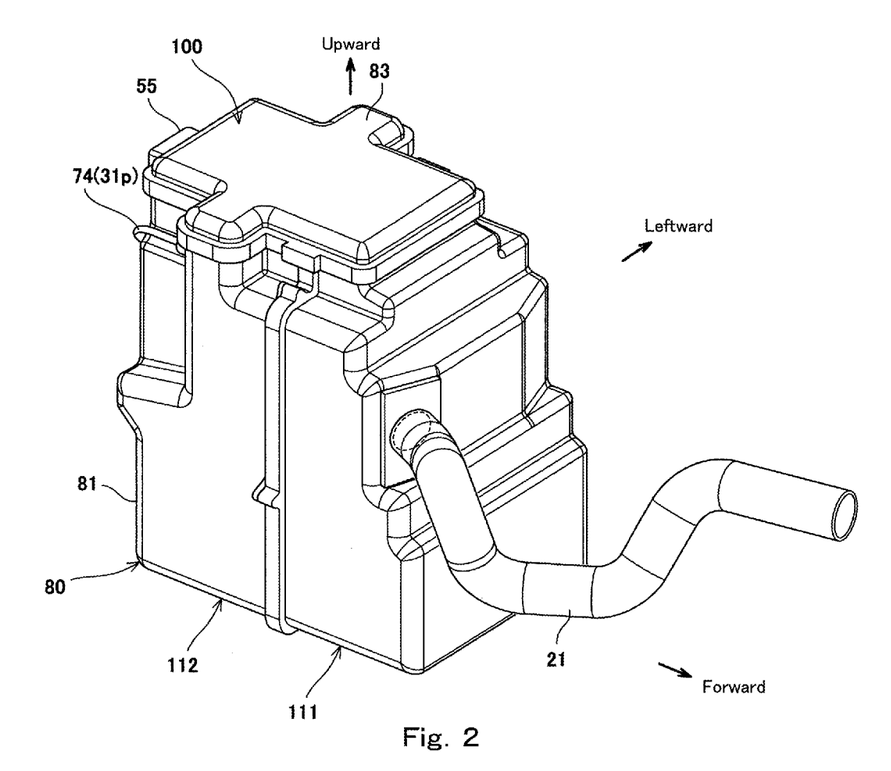
FIG. 2 is a perspective view showing a battery case, when viewed from leftward, above and forward.

FIG. 2 is a perspective view of the battery case 80. As shown in FIG. 2, the battery case 80 includes a case body 81, and an upper lid 83 which is detachably attached to the case body 81. The case body 81 includes a first case member 111 and a second case member 112, which are joined together such that they are separable from each other. Although the case body 81 is dividable in the forward or rearward direction in the example of FIG. 2, the direction in which the case body 81 is divided is not particularly limited. The case body 81 has an opening in an upper portion thereof. The upper lid 83 is attached to close this opening. When a maintenance work of the electric components stored in the battery case 80 is carried out, the electric components are accessed through the opening of the case body 81.

The case body 81 does not have a precise rectangular parallelepiped shape but has a shape in which several portions are recessed in a box of a rectangular parallelepiped shape. Since the case body 81 is a resin product, its insulativity can be improved and an intricate shape can be easily manufactured.

The battery case 80 is configured such that its upper portion and rear portion have a smaller width than the remaining portion. In other words, the dimension of the upper portion of the rear wall of the battery case 80 in the rightward or leftward direction is smaller than the dimension of the lower portion of the rear wall of the battery case 80 in the rightward or leftward direction. The rear upper portion of the side wall of the case body 81 is offset toward the center in the rightward or leftward direction. This portion with a smaller width forms the above stated seat vicinity portion 100. The front wall of the case body 81 recedes rearward in a stepwise manner, in an upward direction. This makes it possible to avoid interference between the battery case 80 and the handle 8 (see FIG. 1) and increase the volume of the battery case 80.

Figure 3:
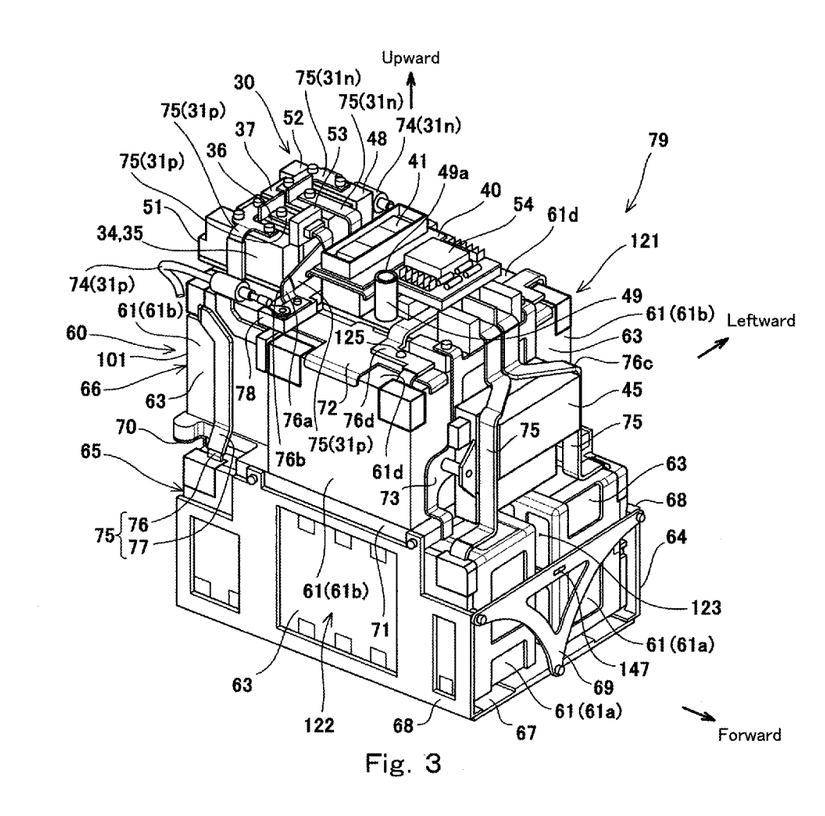
FIG. 3 is a perspective view showing a state in which electric components and electric wires are mounted to a battery unit, when viewed from leftward, above and forward.
Figure 4:
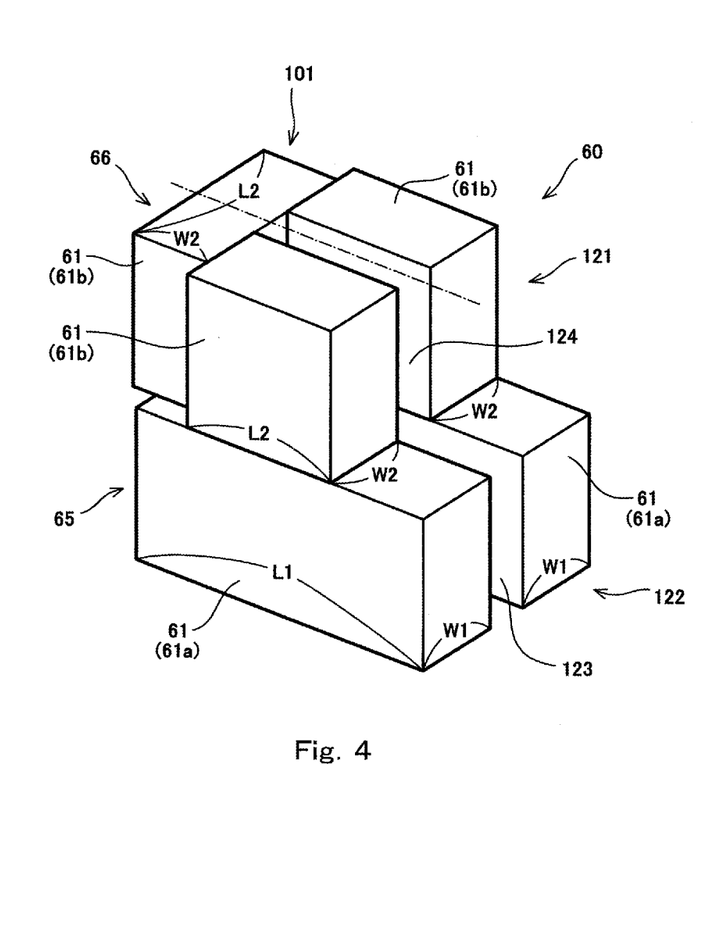
FIG. 4 is a perspective view showing a layout of a plurality of assembled batteries.

FIG. 3 is a perspective view showing a state in which inside electric components 30 and electric wires are mounted to the battery unit 60. FIG. 4 is a perspective view showing a layout of a plurality of assembled batteries 62 constituting the battery unit 60. In description below, in some cases, among the electric components incorporated into the electric motorcycle, the electric components stored into the battery case 80, will be collectively referred to as "inside electric components 30", while the electric components placed outside of the battery case 80, such as the inverter 20 (see FIG. 1) will be collectively referred to as "outside electric components". Also, an assembly of the battery unit 60, the inside electric components 30 and the electric wires, will be referred to as "battery assembly 79".

As shown in FIG. 3, the battery unit 60 includes a plurality of assembled batteries 62 (battery modules) and a battery frame 64. Each of the assembled batteries 62 includes a casing 63 for storing a plurality of battery cells 62 (see FIG. 6). Each of the battery cells 62 (see FIG. 6) is a secondary battery which is capable of storing DC power, and is, for example, a lithium ion battery or nickel metal hydride. The plurality of battery cells 62 (see FIG. 6) are aligned and electrically connected to each other in the interior of the casing 63. The plurality of assembled batteries 62 are densely arranged in the interior of the battery case 80 and electrically connected in series, in a state in which they are fastened to the battery frame 64. The battery unit 60 is configured such that many battery cells 62 (see FIG. 6) are connected in series in an electric view point, and as a result serves as the secondary battery of high-voltage DC power. It should be noted that all of the battery cells constituting the battery unit 60 need not be connected in series. Alternatively, all of the battery cells 62 may be divided into a plurality of groups, the plurality of battery cells in each group may be connected in series, and the plurality of groups may be connected in parallel.

The casing 63 of the assembled batteries 62 has a rectangular parallelepiped shape. When the plurality of assembled batteries 62 densely arranged are viewed in a macroscopic manner, they include a lower section 65 of a rectangular parallelepiped shape, and an upper section 66 stacked on the lower section 65. The front surface of the lower section 65 recedes rearward relative to the front surface of the upper section 66. The left side surface and right side surface of the upper section 66 are substantially coplanar with the left side surface and right side surface of the lower section 66 at its front portion, while the left side surface and right side surface of the upper section 66 are offset at its rear portion toward the center in the rightward or leftward direction, relative to the left side surface and right side surface of the lower section 65. Because of this structure, the rear portion of the upper section 65 has a smaller width and the upper surface of the upper section 65 has a substantially-T shape when viewed from above. The rear portion of the upper section 65 forms at least a seat vicinity portion 101 which is located in the upper portion and rear portion of the whole battery unit 60 and is smaller in the rightward or leftward direction than the remaining portion of the battery unit 60.

The battery frame 64 includes a bottom plate portion 67 supporting the bottom surface of the lower section 65, a pair of lower side cover portions 68 covering the left side surface and right side surface of the lower section 65, a lower front cover portion 69 covering the front surface of the lower section 65, a lower rear cover portion 70 covering the rear surface of the lower section 65, an intermediate plate portion 71 covering the upper surface of the lower section 65 and supporting the bottom surface of the upper section 65, a top plate portion 72 provided on the upper surface of the upper section 66, an upper front cover 73 connecting the front edge of the top plate portion 72 to the front edge of the intermediate portion 71, and an upper rear cover (not shown) connecting the front edge of the top plate portion 72 to the rear edge of the intermediate portion 71.

The battery frame 64 is formed by joining together metal plate members which are press-formed, by means of bolts. Each of the lower side cover portions 68 is fastened at its lower end portion to the bottom plate portion 67, and at its upper end portion to the intermediate plate portion 71. The lower front cover portion 69 is fastened at its upper end portion to the pair of lower side cover portions 68 and at its lower end portion to the bottom plate portion 67. The lower rear cover portion 70 is fastened at its upper end portion to the intermediate plate portion 71 and at its lower end portion to the bottom plate portion 67. The plurality of assembled batteries 62 are joined to the battery frame 60 assembled as described above by means of bolts, etc., thus constructing the battery unit 60.

By joining the assembled batteries 62 to the battery frame 64, the assembled batteries 62 are unitarily coupled together. The battery frame 64 has a frame shape conforming to the outer shape of the battery unit 60, and has a frame shape extending along the sides or surfaces of a cubic body, in the present embodiment. The battery frame 64 has a stiffness sufficient to bear the weight of the assembled batteries 62 by its bottom surface, in a state in which all of the assembled batteries 62 are joined to the battery frame 64.

In accordance with the battery unit 60 configured as described above, since the plurality of assembled batteries 64 are densely arranged such that the lower section 65 and the upper section 66 are stacked together in the vertical direction, it becomes possible to suppress an increase in the dimension of the battery unit 60 in the rightward or leftward direction while increasing the volume of the battery unit 60. This allows the battery unit 60 to be suitably incorporated into the straddle electric vehicle including the vehicle body which is relatively small in the rightward or leftward direction. The assembled batteries 62 are fastened to the battery frame 64. For this reason, the plurality of assembled batteries 62 restrict each other via the battery frame 64. Therefore, even if the battery unit 60 is subjected to loads such as twisting, bending, compression, tension and shear, during driving, it becomes possible to suppress the assembled batteries 62 from being displaced individually. As a result, a weight balance of the vehicle can be stabilized during driving.

FIG. 4 does not show the battery frame to easily see the layout of the assembled batteries. As shown in FIG. 4, in the present embodiment, the battery unit 60 is constructed by vertically combining the plurality of assembled batteries 62. The assembled battery 62 placed at an upper side is smaller in the rightward or leftward direction than the assembled battery 62 placed at a lower side. This allows the seat vicinity portion 101 to be formed in the upper portion of the battery unit 60. Also, the assembled battery 62 placed at a rear side is smaller in the rightward or leftward direction than the assembled battery 62 placed at a front side. This allows the seat vicinity portion 101 to be formed in the rear portion of the battery unit 60. In this way, in the present embodiment, the seat vicinity portion 101 is formed in the rear portion and upper portion of the battery unit 60. The seat vicinity portion 101 has a smaller width than the remaining portion of the battery case 80.

The number of the assembled batteries 62 will be described. In the rear portion of the battery unit 60, the number (one in the example of FIG. 4) of the assembled batteries 62 placed at an upper side and arranged in the rightward or leftward direction is less than the number (two in the example of FIG. 4) of the assembled batteries 62 placed at a lower side and arranged in the rightward or leftward direction. In the upper portion of the battery unit 60, the number (one in the example of FIG. 4) of the assembled batteries 62 placed at a rear side and arranged in the rightward or leftward direction is less than the number (two in the example of FIG. 4) of the assembled batteries 62 placed at a front side and arranged in the rightward or leftward direction.

A specific configuration will be described with reference to FIG. 4. The plurality of assembled batteries 62 which are vertically combined are divided into a first group 121 including one or more assembled batteries 62 which are placed at a lower side and constitute the lower section 65 of the battery unit 60, and a second group 122 including one or more assembled batteries 62 which are placed at an upper side and constitute the upper section of the battery unit 60. Although in the present embodiment, the plurality of assembled batteries 62 are divided to be placed at an upper side and at a lower side, and one first group 121 and one second group 122 are vertically placed, a plurality of first groups 121 and a plurality of second groups 122 may be vertically placed.

Regarding the size of the plurality of assembled batteries 62, the plurality of assembled batteries 62 can also be divided into large first assembled batteries 62a and small second assembled batteries 62b. In the present embodiment, the first group 121 includes two first assembled batteries 62a, while the second group 122 includes three second assembled batteries 62. The first assembled battery 62a is greater in size than the second assembled battery 62b in the forward or rearward direction. The first assembled battery 62a is elongated in a longitudinal direction. The two first assembled batteries 62a are arranged in the rightward or leftward direction such that its longitudinal direction conforms to the forward or rearward direction and their front surfaces are substantially coplanar with each other.

The three second assembled batteries 62b belonging to the second group 122 can be divided into two second assembled batteries 62b at a front side and one second assembled battery 62b at a rear side. The second assembled battery 62b is also elongated in a longitudinal direction, although its degree is smaller than that of the first assembled battery 62a. The two second assembled batteries 62b at a front side are arranged in the rightward or leftward direction such that its longitudinal direction conforms to the forward or rearward direction and their front surfaces are substantially coplanar with each other. One second assembled battery 62b at a rear side is placed such that its longitudinal direction conforms to the rightward or leftward direction and its widthwise direction conforms to the forward or rearward direction. The center (longitudinal center) of the one second assembled battery 62b at a rear side is located between the two second assembled batteries 62b at a front side (see one-dotted line in FIG. 4).

The one second assembled battery 62b at a rear side is placed at the rear end portions of the two first assembled batteries 62a, and extends over the two first assembled batteries 62a in the rightward or leftward direction. The two second assembled batteries 62b at a front side are stacked on and above the two first assembled batteries 62a, respectively.

A widthwise dimension W1 of the first assembled battery 62a is substantially equal to a widthwise dimension W2 of the second assembled battery 62b. This allows the first assembled battery 62a and the second assembled battery 62b to be stacked together such that they do not protrude from each other in the rightward or leftward direction, when viewed from above. At a left side of the battery unit, the left side surface of the first assembled battery 62a is substantially coplanar with the left side surface of the second assembled battery 62b. The right side surface of the first assembled battery 62a is substantially coplanar with the right side surface of the second assembled battery 62b.

A sum of a longitudinal dimension L2 and the widthwise dimension W2 of the second assembled battery 62b is smaller than a longitudinal dimension of the first assembled battery 62a. In this structure, in a state in which the rear surface of one second assembled battery 62b at a rear side is offset rearward relative to the rear surface of the first assembled battery 62a, the front surfaces of the two second assembled batteries 62b at a front side can recede rearward relative to the front surface of the first assembled battery 62a.

Further, the longitudinal dimension L2 of the second assembled battery 62b is smaller than a dimension which is twice as large as the widthwise dimension W2 of the second assembled battery 62b. In this structure, in a state in which the center (longitudinal center) of the one second assembled battery 62b at a rear side in the rightward or leftward direction is located between the two second assembled batteries 62b at a front side, the left side surface of the one second assembled battery 62b at a rear side is located rightward (toward the center in the rightward or leftward direction) relative to the left side surface of the first assembled battery 62a at a left side and the left side surface of the second assembled battery at a left side. In addition, the right side surface of the one second assembled battery 62b at a rear side is located leftward (toward the center in the rightward or leftward direction) relative to the right side surface of the first assembled battery 62a at a right side and the right side surface of the second assembled battery 62b at a right side.

The above dimension relationship will be described. The widthwise dimension W1 of the first assembled battery 62a is equal to the widthwise dimension W2 of the second assembled battery 62b. The longitudinal dimension L1 of the first assembled battery 62a is greater than a sum of the longitudinal dimension L2 and the widthwise dimension W2 of the second assembled battery 62b, and the longitudinal dimension L2 of the second assembled battery 62b is smaller than the dimension which is twice as large as the widthwise dimension W2 of the second assembled battery 62b. Therefore, the longitudinal dimension L1 of the first assembled battery 62a is smaller than a dimension which is 1.5 times as large as the longitudinal dimension L2 of the second assembled battery 62b.

In the present embodiment, the longitudinal dimension of the first assembled battery 62a is greater than the dimension which is 1.5 times as large as the widthwise dimension of the second assembled battery 62b, and the longitudinal dimension L1 of the first assembled battery 62a is about twice as large as the longitudinal dimension L2 of the second assembled battery 62b. In this structure, the seat vicinity portion 101 with a smaller width can be formed appropriately in the upper portion and rear portion of the battery unit 60.

The seat vicinity portion 101 is stored in the seat vicinity portion 100 of the battery case 80, while the remaining portion of the battery unit 80 is stored in the remaining portion of the battery case 80. This allows substantially the entire inner surface of the battery case 80 to be placed close to the outer surface of the battery unit 60 while partially reducing the width of the battery case 80 and stabilizing the rider's driving attitude. In other words, the battery unit 80 is placed by making the best use of the volume of the battery case 80. The battery capacity can be increased by reducing a dead space in the interior of the battery case 80 to a smallest possible degree. In the present embodiment, since the battery unit 80 is constructed by vertically combining the plurality of assembled batteries 62, the shape of the whole battery unit 60 can be designed relatively flexibly. This makes it possible to effectively utilize the volume of the battery case 80.

As described above, the battery case 80 and the battery unit 60 have unique shapes. Since the battery case 80 includes the first case member 111 and the second case member 112, which are joined together such that they are separable from each other, the assembled batteries 62 can be densely arranged in the interior of the battery case 80, even though the battery case 80 and the battery unit 60 have intricate shapes with a partially reduced width.

The two first assembled batteries 62a belonging to the first group 121 are arranged in the rightward or leftward direction such that they are apart from each other with a lower gap 123 between them. In other words, the lower gap 123 is formed between the two first assembled batteries 62a in the rightward or leftward direction such that the lower gap 123 is relatively smaller in dimension in the rightward or leftward direction but relatively greater in the forward or rearward direction and in the vertical direction. Like the first assembled batteries 62a, the two second assembled batteries 62b at a front side belonging to the second group 122 are arranged in the rightward or leftward direction such that they are apart from each other with an upper gap 124 between them. In other words, the upper gap 124 is formed between the two second assembled batteries 62b at a front side in the rightward or leftward direction.

The lower gap 123 opens downward and upward and the upper gap 124 opens downward and upward. The intermediate plate portion 71 (see FIG. 3) which intervenes between the first group 121 and the second group 122 has a through-hole (not shown). The lower gap 123 is in communication with the upper gap 124 via the through-hole of the intermediate plate portion 71.

Figure 5:
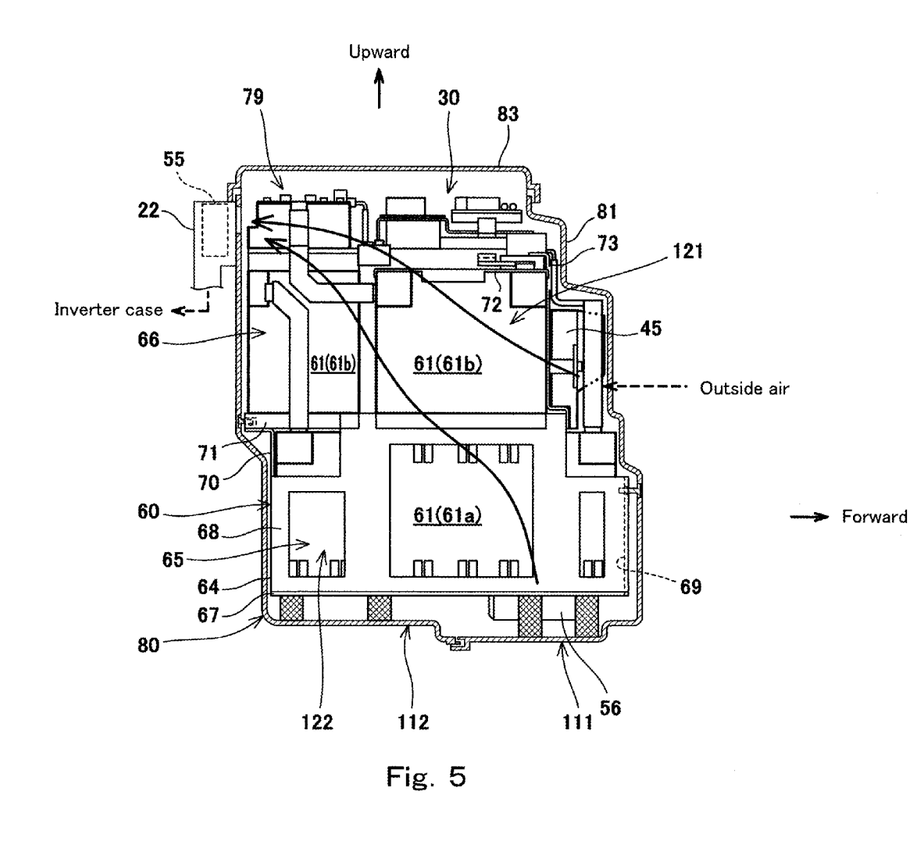
FIG. 5 is a side cross-sectional view showing an internal structure of a battery case.

FIG. 5 is a cross-sectional view showing an internal structure of the battery case 80. As shown in FIG. 5, an indoor fan 56 is attached on the inner bottom portion of the battery case 80 to discharge the air in an upward direction. According to the operation of the indoor fan 56, the air can be flowed in the upward direction from the inner bottom region in the interior of the battery case 80. This air flows in the upward direction within the lower gap 123 (see FIG. 4), through the intermediate plate portion 71, and further in the upward direction within the upper gap 124 (see FIG. 4). This allows the air to flow in the vertical direction from the inner bottom region to the upper region in the interior of the battery case 80, which facilitates heat transfer in the interior of the battery case 80.

After flowing to the upper region in the interior of the battery case 80, the air is guided to the air discharge duct 22 as in the air flowing from the air-intake duct 21 (see FIGS. 1 and 2) into the battery case 80. This makes it possible to appropriately release the heat radiated from the battery unit 80, to outside the battery case 80. The timing at which the indoor fan 56 starts and the timing at which the indoor fan 56 stops are not particularly limited. The indoor fan 56 may operate during charging, while the temperature of the battery unit exceeds a predetermined value, or during driving of the vehicle.

Figure 6:
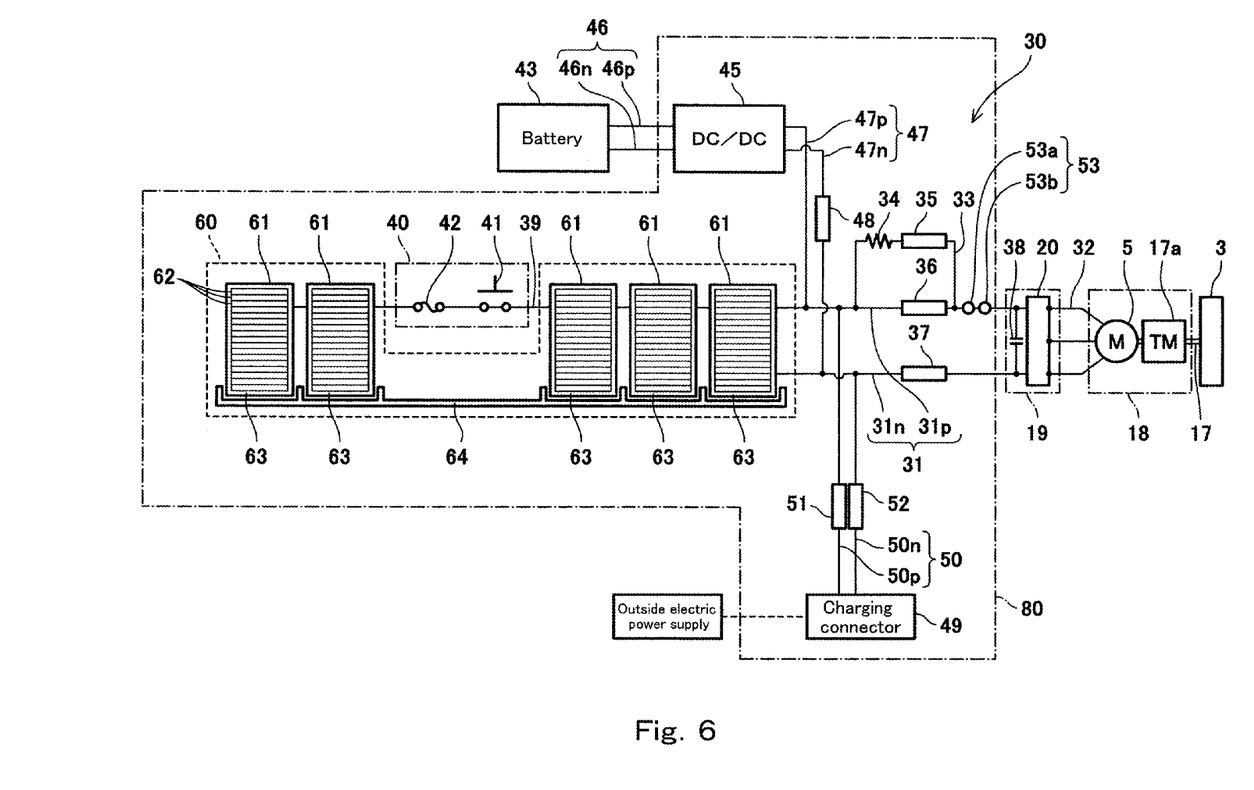
FIG. 6 is a conceptual view showing an electric configuration of the electric motorcycle.

FIG. 6 is a conceptual view showing an electric configuration of the electric motorcycle 1 of FIG. 1. Hereinafter, the electric configuration will be described with reference to FIG. 6. After that, turning back to FIG. 3, the inside electric components 30 and the electric wires constituting the battery assembly 79 will be described.

As shown in FIG. 6, the electric motorcycle 1 includes a charging connector 49, a DC/DC converter 45 and a low-voltage battery 43 in addition to the battery unit 60, the inverter 20 and the electric motor 5 which are described above. The battery unit 60 is connected to the inverter 20 via a high-voltage electric wire 31. The inverter 20 is connected to the electric motor 5 via a three-phase wire 32. The charging connector 49 is connected to the high-voltage electric wire 31 via a charging wire 50. The DC/DC converter 45 is connected to the high-voltage electric wire 31 via a first converter wire 47. The low-voltage battery 43 is connected to the DC/DC converter 45 via a second converter wire 46. The high-voltage electric wire 31 is composed of a power wire 31p and a ground wire 31n. The same applies to the charging wire 50 (see reference symbols 50p, 50n), the first converter wire 46 (see reference symbols 46p, 46n), and the second converter wire 47 (see reference symbols 47p, 47n).

The charging connector 49 is connectable to an outside electric power supply. In a state in which the outside electric power supply is connected to the charging connector 49, the battery unit 60 can be charged with the electric power supplied from the outside electric power supply. At this time, the DC/DC converter 45 drops the voltage of the electric power of the outside electric power supply, and the low-voltage battery 43 can be charged with the electric power with the dropped voltage. The low-voltage battery 43 is a battery for activating auxiliary machines and serves as an electric power supply for electric components (e.g., lighting unit, display unit, controller) which is different from the electric motor 5.

An inverter P-side relay 36 is provided on the power wire 31p of the high-voltage electric wire 31, while an inverter N-side relay 37 is provided on the ground wire 31n of the high-voltage electric wire 31. A charging P-side relay 51 is provided on the power wire 50p of the charging wire 50, while a charging N-side relay 52 is provided on the ground wire 50n of the charging wire 50. A converter relay 48 is provided on the ground wire 46n of the first converter wire 46. A bypass wire 33 is connected to the power wire 31p of the high-voltage electric wire 31 to bypass the inverter P-side relay 36. An anti-rush-current relay 35 is provided on the bypass wire 33.

A service plug 40 is provided on a wire 39 connecting the assembled batteries 62 to each other. The service plug 40 includes a plug 41 which is manually operated by the rider to perform switching between continuity (conduction) and cut-off of the wire 39 and a fuse 42 provided on the wire 39. Two current meters 53a, 53b are provided on the high-voltage electric wire 31 in positions which are closer to the inverter 20 than the inverter P-side relay 36. These current meters 53a, 53b have different resolutions. Since the current meters 53a, 53b with different resolutions are provided, input values used for two or more control processes (e.g., control for the operation of the electric motor, control for monitoring the SOC of the battery unit 60, etc.,) can be suitably selected according to desired control precision.

Among the electric components described above, the charging connector 49, the DC/DC converter 45, the inverter P-side relay 36, the inverter N-side relay 37, the anti-rush-current relay 35, the charging P-side relay 51, the charging N-side relay 52, the service plug 40, and the current meters 53a, 53b are stored in the battery case 80. As described above, the inverter 20 is stored in the inverter case 19 which is different from the battery case 80. The electric motor 5 is stored in the motor case 18 which is different from the battery case 80. The low-voltage battery 43 is placed in a suitable location outside the battery case 80. In addition, a ground leakage detector 54 (see FIG. 3) is stored in the battery case 80. Since the electric components are placed inside or outside the battery case 80, a portion of the high-voltage electric wire 31, the entire of the charging wire 50, the entire of the first converter wire 46, and a portion of the second converter wire 47 are stored in the battery case 80.

Turning back to FIG. 3, among the inside electric components 30, the DC/DC converter 45 is mounted to the front surface of the upper section 66. In front of the front surface of the upper section 66, there is formed a space which can be formed by offsetting the front surface of the lower section 65 forward relative to the upper section 66. The DC/DC converter 45 is placed in this space. The DC/DC converter 45 is in a lowest possible position within the space. The bottom portion of the DC/DC converter 45 is in close proximity to the upper surface of the lower section 65. This makes it possible to avoid that a considerable recessed portion which recedes rearward is formed between the front surface of the DC/DC converter 45 and the front surface of the lower section 65, in the vertical direction. Thus, the front surface of the battery assembly 79 is offset rearward in a stepwise manner from a lower side toward an upper side.

The electric components 30, other than the DC/DC converter 45, are mounted to the upper surface of the battery unit 60. These electric components are arranged in a rectangular region when viewed from above, which may be virtually defined on the upper surface of the battery unit 60. This rectangular region in the forward or rearward direction extends over substantially the entire upper surface of the battery unit 60 in the forward or rearward direction. This rectangular region in the rightward or leftward direction extends over substantially the entire width of the rear portion of the upper section 66 (i.e., seat vicinity portion 101). In other words, the upper surface of the front portion of the upper section 66 constitutes a pair of non-mounting surfaces 61d in which the inside electric components 30 are not placed, in a portion protruding in the rightward or leftward direction, when viewed from the rear portion of the upper section 66.

The relays 35 to 37, 48, 51, 52, are densely arranged in the rear portion of the rectangular region. The current meters 53a, 53b are adjacent to the inverter P-side relay 36. The ground leakage detector 54 is placed in the front portion of the rectangular region. The service plug 40 and the charging connector 49 are placed adjacently to the ground leakage detector 54 in the rightward or leftward direction or between the relays 35 to 37, 48, 51, 52, and the ground leakage detector 54 in the forward or rearward direction.

Among the relays 35 to 37, 48, 51, 52, the inverter P-side relay 36 and the inverter N-side relay 37 are relatively large, while the remaining four relays 35, 48, 51, 52 are relatively small. In view of this, the inverter P-side relay 36 and the inverter N-side relay 37 are arranged side by side in the center portion in the rightward or leftward direction, in the rear portion of the rectangular region. The remaining four relays 35, 48, 51, 52 are arranged such that the two relays 36, 37 are sandwiched between the four relays 35, 48, 51, 52 in the rightward or leftward direction. An exhaust fan 55 is attached to the upper rear portion of the battery case 80. The width of the exhaust fan 55 is smaller than the width of the relays 35 to 37, 48, 51, 52. The relays 35 to 37, 48, 51, 52 are placed to face the exhaust fan 55 in the forward or rearward direction. In this structure, the relays 35 to 37, 48, 51, 52 can be suitably cooled by the air.

The electric wires stored in the battery case 80 are wire harnesses 74 or bus bars 75. Each of the bus bars 75 includes a bent metal plate member 76 and an insulating cover 77 covering a portion between both ends of the metal plate member 76. The metal plate member 76 is placed to extend to conform in shape to the surface of the battery unit 60 and the surfaces of the inside electric components 30. A portion of the metal plate member 76 which is not covered with the insulating cover 77 serves as a contact which is electrically connected to a terminal of the assembled battery 62 or a terminal of the inside electric component 30.

The bus bars 75 are used for electric connection accomplished inside of the battery case 80, while the wire harnesses 74 are used for electric connection between the inside electric components 30 and the outside electric components. The electric connection accomplished inside of the battery case 80 includes connection between the assembled batteries 62, connection between the inside electric components 30, and connection between the assembled batteries 62 and the inside electric components 30. The high-voltage electric wire 31 includes a portion used for the connection between the inside electric components 30 and a portion used for the connection between the inside electric components 30 and the outside electric components. Therefore, the uses of the wire harnesses 74 and the uses of the bus bars 75 are easily understood when an attention is paid to the power wire 31p and the ground wire 31n constituting the high-voltage electric wire 31.

Regarding the power wire 31p, the bus bar 75 is used in a portion connecting the P terminal of the assembled assembly 62 of the upper section 66 to the inverter P-side relay 36. The bus bar 75 is also used in a portion connecting the inverter P-side relay 36 to the current meters. The bus bar 75 and the wire harness 74 are both used in a portion connecting the current meters 53a, 53b which are the inside electric components 30 to the inverter 20 (see FIG. 2) which is the outside electric component. The bus bar 75 extends from the current meters 53a, 53b and the wire harness 74 extends toward the outside electric component. A P-side terminal block 78 is provided on the rear end portion of the non-mounting surface 61d at a right side. The bus bar 75 is electrically connected to the wire harness 74 at the P-side terminal block 78. The same applies to the ground wire 31n. The bus bar 75 is used in a portion connecting the N terminal of the second assembled battery 62 to the inverter N-side relay 37. The bus bar 75 and the wire harness 74 are both used in a portion connecting the inverter N-side relay 37 which is the inside electric component 30 to the inverter 20 which is the outside electric component. The bus bar 75 extends from the inverter N-side relay 37 and the wire harness 74 extends toward the outside electric component. The bus bar 75 is electrically connected to the wire harness 74 at a N-side terminal block (not shown) provided on the rear end portion of the non-mounting surface (not shown) at a left side.

Alternatively, there may be provided a connecting portion between the P-side terminal block and the N-side terminal block to integrate the P-side terminal block and the N-side terminal block. In this structure, by merely providing the connecting portion onto the upper surface of the battery unit 60, the two terminal blocks can be mounted to the battery unit 60. In addition, the electric components such as the relays can be mounted to the connecting portion. This can prevent a short circuit from being formed between the electric components and the battery unit 60.

Two wire harnesses 74 used in the power wire 31p and the ground wire 31n extend rearward from the non-mounting surface 61d. These two wire harnesses 61d are apart outward in the rightward or leftward direction from the rear portion of the upper section 66. Also, these two wire harnesses 74 overlap with the upper surface of the rear portion of the lower section 65.

Many of the electric wires connected to the battery unit 60 are placed to extend to conform in shape to the surface of the battery unit 60 and the surfaces of the inside electric components 30. This makes it possible to compactly configure the structure in the vicinity of the inside electric components 30. The wire harness 74 used in the high-voltage electric wire 31 is also placed in an outward region of the rectangular region in the rightward or leftward direction and does not interfere with the inside electric components 30. If the metal plate member 76 is formed to have a great width, it can easily have a greater cross-sectional area than the wire harness 74, which makes it possible to reduce a need to choose a material which is expensive and has a great specific weight, such as silver and copper, although these have a high electric conductivity. For example, aluminum is suitably used as the metal plate member 76 to make the electric wire inexpensive and light.

For example, the metal plate member 76 is an aluminum plate member with a smaller thickness, and has a pair of a primary surface 76a and a secondary surface 76b which is at a reverse side. The metal plate member 76 has a bent portion 76c which is bent with respect to the primary surface 76a or the secondary surface 76b such that a fold line is formed in the primary surface 76a or the secondary surface 76b. By providing the bent portion 76c, the metal plate member 76 is easily deflected in a direction in which the metal plate member 76 is bent or in a direction in which the bent metal plate member 76 is returned to its original shape. Even if a mounting dimension error occurs when the assembled batteries 62 are laid out and the inside electric components 30 are mounted, the deflection of the metal plate member 76 absorbs the error, and allows for the electric connection between the assembled assemblies 62 and the inside electric components 30 and the electric connection between the inside electric components 30. This can simplify an assembling work of the battery unit 60 and the inside electric components 30.

To fasten the metal plate member 76, the metal plate member 76 may be provided with a horizontal portion 76d extending horizontally to conform to the upper surface of the battery unit 60, and the horizontal portion 76d may be fastened to the upper portion of the battery unit 60 (especially, top portion 72 of the battery frame 64) by means of a fastener member 125 such as bush made of an insulating material. This makes it possible to mount the bus bar 75 to the battery unit 60 while suppressing a vertical vibration of the bus bar 75 and preventing formation of a short circuit between the metal plate member 76 and the battery unit 60. Thus, generation of a noise can be suppressed or fatigue of the metal plate member 76 can be mitigated.

As shown in FIG. 3, the wire harness 74 can be placed such that it extends through a space outside the seat vicinity portion 101, toward the inverter 20. In this case, as indicated by two-dotted line of FIG. 1, the seat vicinity portion 100 may be attached with a cover member 126 for protecting the harness. Since the cover member 126 is provided to cover the seat vicinity portion 100, the rider can be protected from the wires through which the high-voltage current flows while keeping at a small value, the dimension of the portion sandwiched with the knees in the rightward or leftward direction.

Although the present embodiment has been described above, the above described configuration is merely exemplary, and can be suitably changed. For example, the battery case 80 may be configured in any way so long as it has at least the seat vicinity portion 100 which is near the seat 9. The battery case 80 may have a portion other than the seat vicinity portion 100, for example, a lower portion located below the foot steps 10, a front upper portion which is near the head pipe 11, a front lower portion which is near a fender of the front wheel 2, etc. The battery unit 60 may be configured in the same manner. The battery unit 60 may be configured in any way so long as it has at least the seat vicinity portion 101 which is near the seat 9. The battery unit 60 may have a portion other than the seat vicinity portion 101, for example, a lower portion located below the foot steps 10.

The seat vicinity portion 100 includes portions facing the knees or thighs of the rider straddling the seat 9. There is a possibility that the seat vicinity portion 100 is set at a different position depending on a type of a vehicle. The seat vicinity portion 100 includes at least any one of a portion which is as high as a seat surface of the seat 9, a portion located below the seat surface, and a portion located above the seat surface, which are in front of the seat 9.

Although in the above described embodiment, the seat vicinity portion 100 is located above the frame, a pair of right and left frames may be placed outward in the rightward or leftward direction relative to the seat vicinity portion 100 such that a spacing between them in the rightward or leftward direction is set smaller. In a case where the knees or thighs of the rider are close to the frames, the rider can easily sandwich the vehicle body with the knees and the thighs. Instead of the pair of right and left frames, a pair of right and left cowlings may be placed. Of course, without providing the frames and the cowlings, the rider may sandwich the battery case by the knees and the thighs.

Figure 7:
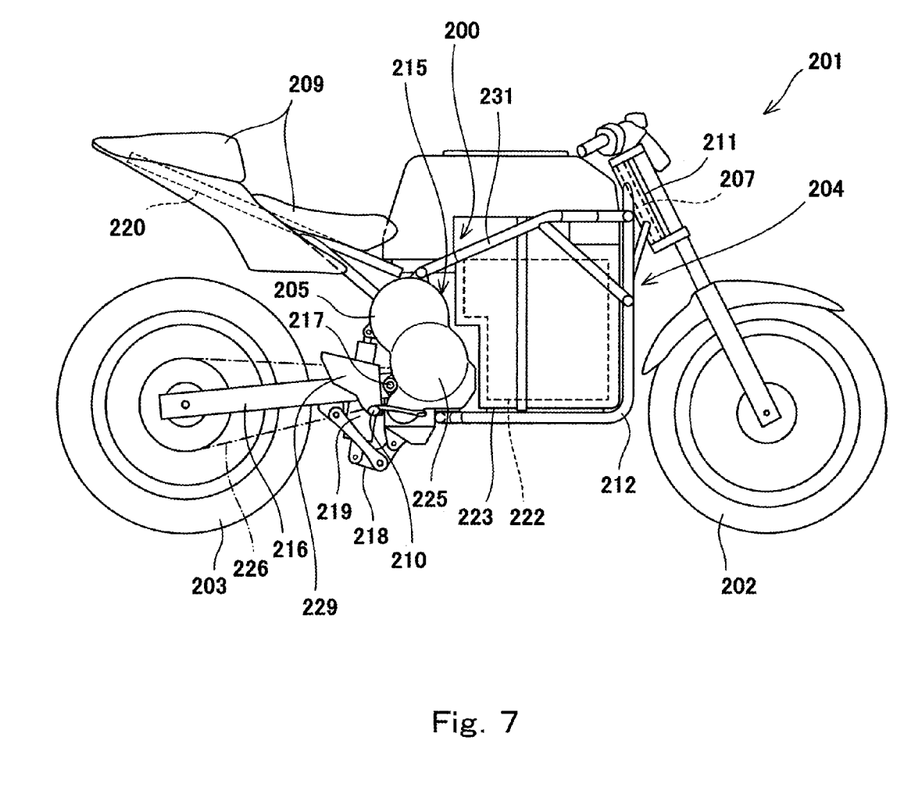
FIG. 7 is a right side view of an electric motorcycle according to a modified example of the present invention.

FIG. 7 is a right side view of an electric motorcycle 201 according to a modified example of the present invention. As shown in FIG. 7, the electric motorcycle 201 includes a motor unit case 205 which stores an electric motor 205 together with a transmission 225. The motor unit case 205 constitutes a portion of a vehicle body frame 204. Specifically, the vehicle body frame 204 includes a head pipe 211 which supports a steering shaft 207 for changing a direction of the front wheel 2 such that the steering shaft 207 is rotatable, a first frame 212 extending downward from the head pipe 211 and then rearward, and a second frame 231 extending rearward from the upper portion of the first frame 212. The rear end portion of the first frame 212 is joined to the lower portion of the motor unit case 215. The rear end portion of the second frame 231 is joined to the upper portion of the motor unit case 215. A pivot 217 around which a swing arm 216 is pivotable is provided at the rear end portion of the motor unit case 215. A rear suspension 219 is placed to extend vertically. The upper end portion of the rear suspension 219 is coupled to the rear end portion and upper portion of the motor unit case 215. The rear suspension 219 crosses the swing arm 216 when viewed from a side. The lower end portion of the rear suspension 219 is placed below the swing arm 216 and coupled to the swing arm 216 via a link mechanism 218 joined to the bottom portion of the motor unit case 215. A seat frame 220 extends rearward from the upper end portion of the motor unit case 215. The seat 209 is mounted onto the seat frame 220. In this way, the motor unit case 215 constitutes a portion of the vehicle body frame 204. The motor unit case 215 serves as a swing arm bracket used for mounting the swing arm and a suspension bracket used for mounting the rear suspension.

The motor unit case 215 is elongated in the direction in which the electric motor 205 and the transmission 225 are arranged when viewed from a side. The electric motor 205 is placed above the transmission 225. The motor unit case 215 is placed to extend vertically. A chain 226 is wrapped around the lower portion of the motor unit case 215 to transmit the driving power to a rear wheel 203. A chain cover 229 is provided rearward relative to the lower portion of the motor unit case 215. A pair of right and left foot steps 210 are provided on the right side portion and left side portion of the chain cover 229, respectively. The motor unit case 215 is increased in dimension in an upward direction from a portion facing the chain cover 229. The upper end portion of the motor unit case 215 is close to the seat 209 in the vertical direction.

Since the motor unit case 215 is placed to extend vertically as described above, a battery unit 221 can be placed in a lower position. This can lower the center of gravity of the vehicle. Instead, the chain 226 covered with the chain cover 229 is wrapped around a sprocket (not shown) mounted on the output shaft of the transmission 225. By comparison, the electric motor 205 is placed above the transmission 225. The motor unit case 215 contains the electric motor 205 and the transmission 225. Because of this, the motor unit case 215 has an increased size because it includes a portion which stores the electric motor 205, above the portion facing the chain cover 229. With the structure and layout of the motor unit case 215 as described above, the motor unit case 215 also serves as a portion of the structure for knee gripping. Therefore, it is not necessary to increase a size of a seat vicinity portion 200 with a small width in the battery case 223. By providing the motor unit case 215 such that it extends vertically as described above, the size of the battery unit 222 can be further increased.

Although the electric motorcycle has been exemplary described in the embodiment of the present invention, the present invention is applicable to a straddle electric vehicle so long as it is placed between the steering shaft and the seat. For example, the present invention is applicable to other straddle vehicles such as an all terrain vehicle (ATV), a three-wheeled vehicle or personal watercraft. Although the vehicle which does not include an internal combustion engine and drives only by the driving power generated by the electric motor is exemplary described as the electric vehicle, the present invention is also applicable to a hybrid vehicle including the internal combustion engine in addition to the electric moor.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has advantages that a high continued driving capability is attained and a rider can easily sandwich a vehicle body with knees, and is effectively applicable to a straddle electric vehicle such as an electric motorcycle.

The invention claimed is:

1. A straddle electric vehicle comprising:
    a steering shaft for steering a front wheel;
    a seat which is placed rearward relative to the steering shaft and on which a rider is seated in a straddle state;
    an electric motor for generating driving power for moving the straddle electric vehicle;
    a battery unit which is an electric power supply for activating the electric motor; and
    a battery case for storing the battery unit;

wherein the battery case is placed between the steering shaft and the seat in a forward or rearward direction;
wherein the battery case includes at least a seat vicinity portion which is placed in front of the seat and faces the seat in the forward or rearward direction; and
wherein the seat vicinity portion is smaller in dimension in a rightward or leftward direction than a portion of the battery case which is other than the seat vicinity portion and is placed above the seat.

2. The straddle electric vehicle according to claim 1,
wherein the battery unit includes at least a seat vicinity portion which faces the seat in the forward or rearward direction via the battery case; and
wherein the seat vicinity portion of the battery unit is smaller in dimension in the rightward or leftward direction than a portion of the battery unit which is other than the seat vicinity portion.

3. A straddle electric vehicle comprising:
a steering shaft for steering a front wheel;
a seat which is placed rearward relative to the steering shaft and on which a rider is seated in a straddle state;
an electric motor for generating driving power for moving the straddle electric vehicle;
a battery unit which is an electric power supply for activating the electric motor; and
a battery case for storing the battery unit;
wherein the battery case is placed between the steering shaft and the seat in a forward or rearward direction;
wherein the battery case includes at least a seat vicinity portion which faces the seat in the forward or rearward direction;
wherein the seat vicinity portion is smaller in dimension in a rightward or leftward direction than a portion of the battery case which is other than the seat vicinity portion;
wherein the battery unit includes at least a seat vicinity portion which faces the seat in the forward or rearward direction via the battery case;
wherein the seat vicinity portion of the battery unit is smaller in dimension in the rightward or leftward direction than a portion of the battery unit which is other than the seat vicinity portion;
wherein the battery unit includes a plurality of assembled batteries which are combined in a vertical direction; and
wherein the assembled battery placed at an upper side is smaller in dimension than the assembled battery placed at a lower side in the rightward or leftward direction, and constitutes the seat vicinity portion of the battery unit.

4. The straddle electric vehicle according to claim 3,
wherein in a rear portion of the battery unit, the number of assembled batteries placed at the upper side in the rightward or leftward direction is less than the number of assembled batteries placed at the lower side in the rightward or leftward direction.

5. The straddle electric vehicle according to claim 3,
wherein the assembled batteries placed at the lower side are combined so as to form a lower gap which opens at its upper side;
wherein the assembled batteries placed at the upper side are combined so as to form an upper gap which opens at its lower side; and
wherein the lower gap is in communication with the upper gap.

6. The straddle electric vehicle according to claim 3,
wherein in an upper portion of the battery unit, the number of assembled batteries which are placed at a rear side and arranged in the rightward or leftward direction is less than the number of assembled batteries which are placed at a front side and arranged in the rightward or leftward direction.

7. A straddle electric vehicle comprising:
a steering shaft for steering a front wheel;
a seat which is placed rearward relative to the steering shaft and on which a rider is seated in a straddle state;
an electric motor for generating driving power for moving the straddle electric vehicle;
a battery unit which is an electric power supply for activating the electric motor; and
a battery case for storing the battery unit;
wherein the battery case is placed between the steering shaft and the seat in a forward or rearward direction;
wherein the battery case includes at least a seat vicinity portion which faces the seat in the forward or rearward direction;
wherein the seat vicinity portion is smaller in dimension in a rightward or leftward direction than a portion of the battery case which is other than the seat vicinity portion;
wherein the battery unit includes at least a seat vicinity portion which faces the seat in the forward or rearward direction via the battery case;
wherein the seat vicinity portion of the battery unit is smaller in dimension in the rightward or leftward direction than a portion of the battery unit which is other than the seat vicinity portion;
wherein the battery unit includes a plurality of assembled batteries which are combined, in an interior of the battery case; and
wherein the assembled battery placed at a rear side is smaller in dimension than the assembled battery placed at a front side in the rightward or leftward direction, and constitutes the seat vicinity portion of the battery unit.

8. The straddle electric vehicle according to claim 1,
wherein a rear portion and an upper portion of the battery case have a smaller width than a portion of the battery case which is other than the rear portion and the upper portion.

9. The straddle electric vehicle according to claim 3,
wherein the battery unit includes a battery frame for fastening the plurality of assembled batteries; and
wherein the plurality of assembled batteries are densely arranged in a state in which the plurality of assembled batteries are fastened to each other by the battery frame, in an interior of the battery case.

10. A straddle electric vehicle comprising:
a steering shaft for steering a front wheel;
a seat which is placed rearward relative to the steering shaft and on which a rider is seated in a straddle state;
an electric motor for generating driving power for moving the straddle electric vehicle;
a battery unit which is an electric power supply for activating the electric motor;
a battery case for storing the battery unit;
electric components mounted to an upper surface of the battery unit; and
a metal plate member placed to conform in shape to a surface of the battery unit and surfaces of the electric components;
wherein the battery case is placed between the steering shaft and the seat in a forward or rearward direction;
wherein the battery case includes at least a seat vicinity portion which faces the seat in the forward or rearward direction;

wherein the seat vicinity portion of the battery case is smaller in dimension in a rightward or leftward direction than a portion of the battery case which is other than the seat vicinity portion;

wherein the metal plate member electrically connects the battery unit to the electric components and electrically connects the electric components to each other; and wherein the metal plate member has a pair of primary surface and a secondary surface, and a bent portion which is bent with respect to the primary surface or the secondary surface.

11. The straddle electric vehicle according to claim 10, comprising:

an inverter for converting DC power stored in the battery unit into AC power; and a wire member for electrically connecting the battery unit and the inverter to each other;

wherein the battery unit includes a battery frame for fastening the plurality of assembled batteries to each other; and the plurality of assembled batteries are densely arranged in a state in which the plurality of assembled batteries are fastened to each other by the battery frame, in an interior of the battery case; and wherein the wire member includes the metal plate member extending from the battery unit and a wire harness connected to the inverter, a terminal block for connecting the metal plate member to the wire harness is stored in the battery case, and the terminal block is fastened to the battery frame.

12. The straddle electric vehicle according to claim 1, wherein the seat vicinity portion of the battery case is smaller in dimension in the rightward or leftward direction than a portion of the battery case which is in front of the seat vicinity portion.

13. The straddle electric vehicle according to claim 1, wherein the seat vicinity portion of the battery case is smaller in dimension in the rightward or leftward direction than a portion of the battery case which is below the seat vicinity portion.

14. The straddle electric vehicle according to claim 1, wherein the seat vicinity portion of the battery case is smaller in dimension in the rightward or leftward direction than a portion of the battery case which is in front of the seat vicinity portion and a portion of the battery case which is below the seat vicinity portion.

* * * * *